Oct. 1, 1957 P. J. GEERLINGS 2,808,029
HOG FEEDER
Filed Nov. 30, 1956
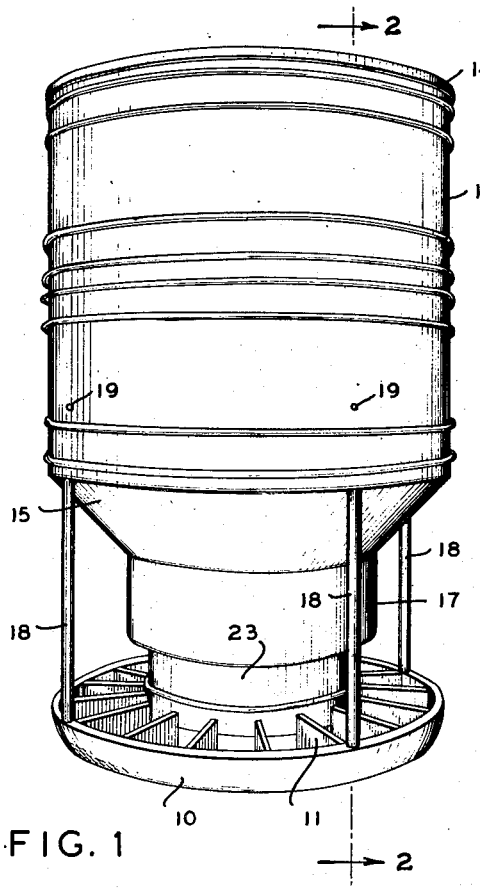
FIG. 1
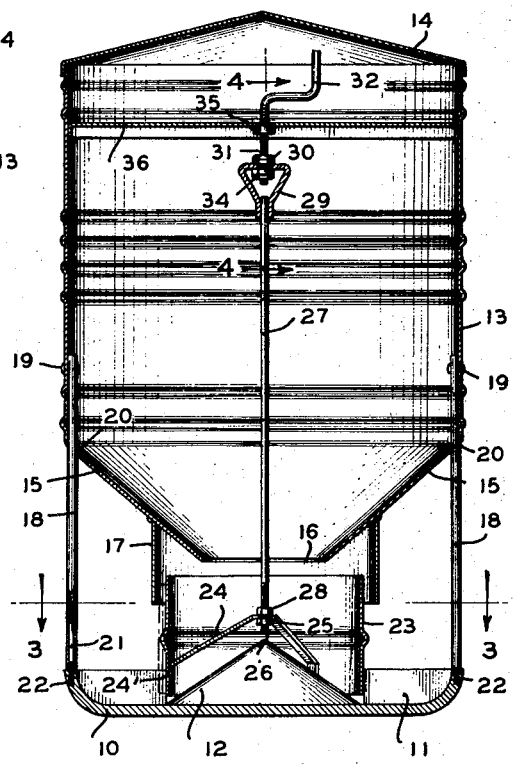
FIG. 2
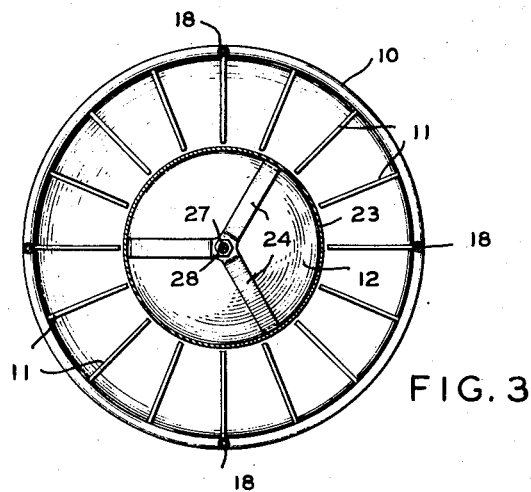
FIG. 3
FIG. 4
INVENTOR
P. J. GEERLINGS
BY *A. Yates Dowell*
ATTORNEYS

2,808,029
HOG FEEDER

Petrus J. Geerlings, Waterloo, Iowa

Application November 30, 1956, Serial No. 625,492

5 Claims. (Cl. 119—53.5)

This invention relates to the care and feeding of farm animals or livestock, especially hogs, and to labor-saving feeders employed in the fattening of hogs for the market and at a cost which will permit a profit to be realized from the sale of the same.

The invention relates more particularly to feeders employed in the feeding of hogs and other livestock which without attention are intended to supply food and promote eating by the hogs and cause increase in the weight of the animals preparatory to their being taken to market.

Automatic feeders of various kinds have been produced and tested however these have not been satisfactory because of cost, waste, packing and clogging of the feed, and their general failure to satisfactorily perform the function for which they were designed.

It is an object of the invention to provide a relatively simple and inexpensive feeder which consists of few parts, is substantially foolproof, and will dispense substantially any kind of feed regardless of whether coarse or fine.

Another object of the invention is to provide a feeder in which the construction does not allow appreciable pressure buildup and which therefore permits the construction of a feeder of substantially any size up to 50 or more tons and which can be easily adjusted to control the amount of feed discharged.

A further object of the invention is to provide a feeder having relatively small feeding areas so that hogs will be restricted in sidewise movement and consequently no substantial waste, as well as a feeder in which the action of the hogs prevents the food from clogging and causes its discharge of feed into the feed trough on all sides of the feeder.

Other objects and advantages of the invention will be apparent from the following description taken in conjunction with the accompanying drawing wherein:

Fig. 1 is a perspective illustrating one application of the invention;

Fig. 2, a vertical section on the line 2—2 of Fig. 1;

Fig. 3, a horizontal section on the line 3—3 of Fig. 2; and

Fig. 4, a vertical section on an enlarged scale taken on the line 4—4 of Fig. 2.

Briefly stated the invention comprises a relatively shallow circular feed trough with radial partitions defining relatively narrow feed spaces between the same so that the animals fed are restricted in sidewise movement and waste is minimized. A distributor cone is disposed in the center of the feed trough and feed is discharged downwardly onto said cone where it is caused to gravitate or be distributed radially in all directions. A hopper is mounted above the trough, such hopper having a relatively small discharge opening spaced near the trough above the dispenser cone, a sleeve type dispenser valve suspended loosely about the discharge end of the hopper and said cone and movable both as to elevation and lateral position and adapted to be engaged and moved by animals, and rod adjustably suspending said dispensing valve so that it can be adjusted to a desired setting to effect the proper discharge of feed.

With continued reference to the drawing, the feeder of the present invention comprises a feed trough 10 provided with radial partitions 11 defining independent feed spaces of cells therebetween. The feed trough is preferably in the form of a shallow flat bottom bowl with an upwardly curved side wall which facilitates the dispensing of the feed and the cleaning of the trough.

A distributor cone 12 is located centrally within the trough so that the feed will be caused to travel outwardly from the center of the device. The bowl cone and partitions may be cast or molded as one piece or they may be fabricated of multiple parts. If the trough is made of relatively heavy metal the weight will tend to prevent upsetting and overcome topheaviness.

In order to supply feed centrally to the feed trough so that it can be distributed and consumed, a feed hopper or container is provided which is similar in configuration to an inverted conventional milk can. The hopper has a cylindrical wall 13 one end of which is open and is adapted to receive a removable cover 14. The opposite end of the hopper is provided with a downwardly and inwardly extending frusto-conical wall 15 providing a discharge opening 16 and about which is concentrically disposed an annular cylindrical collar 17.

Means is provided for mounting the hopper or container over the trough with the cylindrical mouth 16 of the container disposed centrally over the trough 10, such means including a series of tubular posts 18 attached by fasteners 19 to the cylindrical wall 13 of the container, such posts being disposed in openings 20 in the frusto-conical wall 15 although they may be otherwise attached. Upstanding rods or posts 21 are mounted on the rim of the trough 10 and are telescopically received within the tubular posts 18. These rods or posts 21 may be attached to the trough 10 in any desired manner as, for example, by threads 22. Pulverant feed within the hopper or container may flow downwardly against the distributor baffle or cone 12 and into the spaces between the partitions 11.

In order to facilitate the flow of feed from the hopper or container into the feed trough and to regulate the amount of such flow, a dispenser valve is provided in the form of a cylindrical sleeve 23, such sleeve being slightly smaller than and having its upper end fitting within the collar 17, the lower end of the sleeve 23 being substantially the same diameter as the distributor cone 12 through the same is not necessary. The cylindrical dispenser valve 23 is permitted horizontal movement restricted by the length of the partitions 11 and can move vertically according to the spacing of the frusto-conical wall above the trough 10, this limited horizontal-vertical movement is adequate to allow the flow of the pulverant material into the trough as it is consumed and the sleeve is vertically adjustable in accordance with the particle size of the material. The movement of the cylinder valve and the rod 27 will overcome any tendency of the pulverant material to cake.

In order to raise and lower the cylinder valve 23, such valve is provided with a spider or bracket 24, the multiple arms of which are attached by spot welds 24' or otherwise secured to the valve 23 and the center is provided with an opening 25 in which is received the threaded end 26 of the rod 27, a pair of lock nuts 28 engaging the threaded end 26 of the rod 27 serving to maintain the parts in assembled relation. To the upper end of the rod 27 is welded or otherwise secured a yoke 29 having an opening 30 in which is rotatably received the threaded spindle 31 having a crank or angular portion 32 on its upper end, such spindle having a pair of jam nuts 34 above and a pair of jam nuts below the yoke 29 or other means providing a swivel connection. The spindle 31 is disposed in a nut 35 secured by a weld 35' or otherwise attached to supporting bracket 36 U-shaped in cross-section and having its extremities welded or otherwise secured within the cylinder 13. By rotating the spindle by means of its crank the dispenser valve 23 will be raised and lowered to control the discharge of feed.

When the sleeve is pushed in any direction during feeding it will cause feed to flow into the opposite side of the trough.

It will be apparent from the foregoing that a relatively simple, inexpensive, efficient, reliable feeder is provided which can be readily adjusted to accommodate feeds of different character, and particle size, as well as a feeder that requires minimum attention.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A hog feeder comprising a circular relatively shallow bowl type feed trough having a curved wall around its margin connecting its rim and its bottom, a distributing cone disposed centrally within said trough, radial partitions around the outer portion of said trough providing individual compartments, a cylindrical hopper for feed to be dispensed, means supporting said hopper on said trough with its axis upright and its upper end open, a cover for said open upper end, the lower portions of said hopper tapering inwardly and downwardly to an open lower end providing a central discharge for feed, a cylindrical collar attached midway of said tapering portion about said open lower end, a cylindrical sleeve forming a dispensing valve within and of a smaller diameter than said collar and larger than said feed discharge and movable laterally and vertically within said collar, a spider within and attached to said sleeve, a rod attached to said spider and extending axially upward within said cylindrical hopper, and a member attached to said rod for adjusting the vertical position of said valve.

2. A hog feeder comprising a circular bowl type feed trough having relatively flat bottom and a relatively low side wall with a curved portion therebetween, a distributing baffle disposed centrally within said trough, partitions around the outer portion of said trough providing individual compartments, a hopper for feed to be dispensed, means supporting said hopper above said trough with its axis upright, the lower portions of said hopper tapering inwardly and downwardly to an open lower end providing a central discharge for feed, a collar attached midway of said tapering portion about said open lower end, a sleeve forming a dispensing valve within and of a smaller diameter than said collar and larger than said feed discharge and movable laterally and vertically within said collar, a spider within and attached to said sleeve, a rod attached to said spider and extending axially upward within said cylindrical hopper, and a member attached to said rod for adjusting the vertical position of said valve.

3. A hog feeder comprising a bowl type trough having a relatively low side wall, a distributor having wall structure converging upwardly from said trough, a hopper for feed to be dispensed, supporting means mounting said hopper above said trough, said hopper tapering downwardly to an open lower end providing a discharge for feed, a collar about said open lower end attached intermediate said tapering portion, a sleeve forming a dispensing valve within said collar and moveable laterally and vertically therein, said sleeve being of smaller transverse dimension than said collar and of larger transverse dimension than said discharge for feed, sleeve mounting means within and attached to said sleeve, means attached to said sleeve mounting means and extending upwardly within said hopper and attached thereto, said distributor extending upwardly into said sleeve and spaced therefrom permitting movement of said sleeve relative to said distributor.

4. The invention according to claim 3 in which the sleeve mounting means is a spider and the upwardly extending means is a rod.

5. The invention according to claim 4 in which means is provided for adjusting the rod relative to said hopper.

References Cited in the file of this patent
UNITED STATES PATENTS

| | | |
|---|---|---|
| 2,485,832 | Keagle | Oct. 25, 1949 |
| 2,525,385 | Uhrenholdt | Oct. 10, 1950 |